United States Patent [19]

Komurasaki

[11] Patent Number: 4,476,405
[45] Date of Patent: Oct. 9, 1984

[54] BEARING COOLING MECHANISM FOR VEHICULAR A.C. GENERATOR

[75] Inventor: Keiichi Komurasaki, Himeji, Japan

[73] Assignee: Mitsubishi Denki Kabushiki Kaisha, Tokyo, Japan

[21] Appl. No.: 452,048

[22] Filed: Dec. 22, 1982

[30] Foreign Application Priority Data

Dec. 26, 1981 [JP] Japan .................. 56-194338[U]

[51] Int. Cl.$^3$ ............................................. H02K 9/04
[52] U.S. Cl. .................................. 310/60 R; 310/62; 310/63; 310/68 D; 310/90
[58] Field of Search ................. 310/59, 60, 61, 62–65, 310/90, 68 R, 68 D

[56] References Cited

U.S. PATENT DOCUMENTS

| | | | |
|---|---|---|---|
| 3,517,504 | 6/1970 | Sakamoto | 310/62 X |
| 3,862,443 | 1/1975 | Edick | 310/90 X |
| 4,115,030 | 9/1978 | Inayaki et al. | 310/62 X |
| 4,141,669 | 2/1979 | Darby et al. | 310/59 X |
| 4,162,419 | 7/1979 | DeAngelis . | |
| 4,226,134 | 10/1980 | Sohnle . | |
| 4,418,295 | 11/1983 | Shiga | 310/68 D X |
| 4,431,931 | 2/1984 | Perrier et al. | 310/62 X |

*Primary Examiner*—Donovan F. Duggan
*Attorney, Agent, or Firm*—Wenderoth, Lind & Ponack

[57] ABSTRACT

A bearing cooling mechanism for a vehicular A.C. generator including a rotor having a rotary shaft rotatably mounted to a frame through two opposite bearings comprises a pulley and a cooling fan fixed in overlapped relationship on the rotary shaft at one end protruding from the adjacent bearing and, in addition to holes disposed on both end surfaces of the frame, four ventilating holes extending at equal angular intervals through those portions of the overlapped pulley and cooling fan adjacent to the rotary shaft.

1 Claim, 3 Drawing Figures

BEARING COOLING MECHANISM FOR VEHICULAR A.C. GENERATOR

BACKGROUND OF THE INVENTION

This invention relates to a bearing cooling mechanism for a vehicular AC generator.

The interior of vehicular AC generators is put at a considerably elevated temperature because they are exposed to hot air resulting from associated internal combustion engines and further generate heat due to both electric resistances of electric coils involved and frictional resistances of associated bearings. With the interior of such generators put at the elevated temperature, the bearings are impeded from being smoothly rotated which will, in turn, result in their fusing together. Accordingly, in order to avoid such a situation, the bearings have been formed of a material high in heat resistance. Alternatively the vehicular AC generators might be provided at one end with suction ports for sucking cooling air and at the other end with the cooling fan so that the cooling fan is rotated to suck the air into the interior thereof through the suction ports by means of the action of the resulting suction force thereby to cool the interior of the generators.

However, high heat resistance materials are expensive and the use thereof has resulted in a lack of economy. Also the use of the cooling mechanism as described above has been disadvantageous in that the bearings cannot be sufficiently cooled. This is because cooling air sucked through the suction ports is warmed in a clearance formed between a rotor and a stator of the generator and because the bearings are disposed at their positions where they are not exposed to the cooling air.

Accordingly, it is an object of the present invention to provide a new and improved bearing cooling mechanism for a vehicular AC generator which mechanism is enabled to sufficiently cool the bearings by directly exposing the latter to cooling air.

SUMMARY OF THE INVENTION

The present invention provides a bearing cooling mechanism for vehicular AC generator, comprising a frame, a rotary shaft of a rotor rotatably mounted to the frame through bearings, and a pulley and a cooling fan fixedly secured in overlapping relationship on the rotary shaft at one end thereof protruding from an adjacent one of the bearings. The bearing cooling mechanism includes further a plurality of ventilating holes extending through those portions of the pulley and the cooling fan adjacent to the rotary shaft to be located at predetermined equal angular intervals about the longitudinal axis of the rotary shaft.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
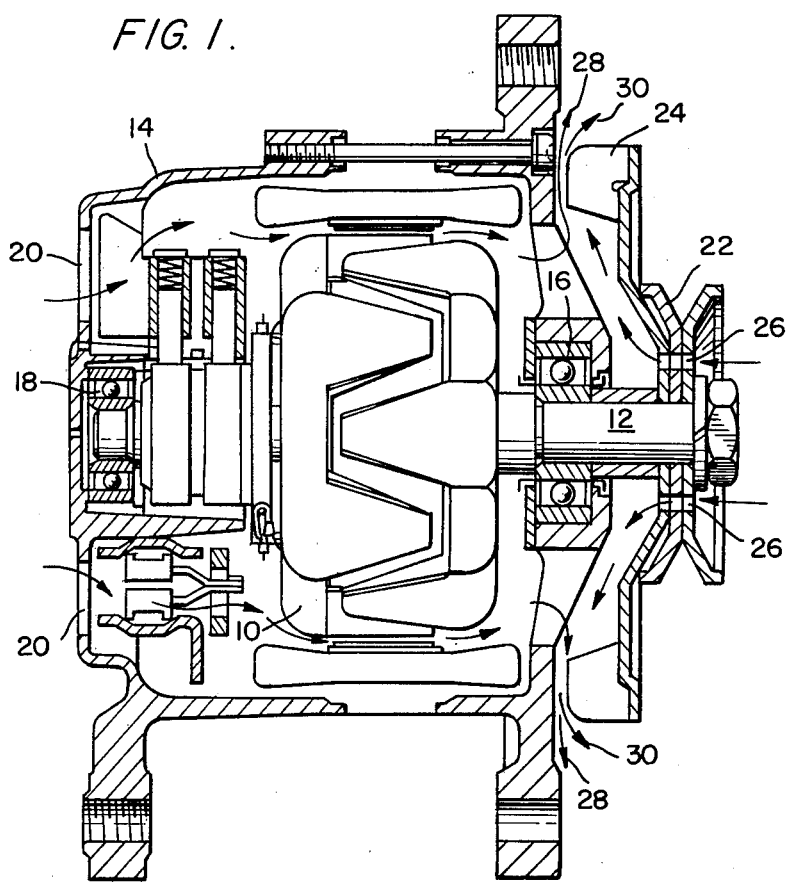
FIG. 1 is a side elevational sectional view of a vehicular AC generator including one embodiment according to the bearing cooling mechanism of the present invention for a vehicular AC generator with parts illustrated in side elevation.

Referring now to FIG. 1 of the drawings, there is illustrated a vehicular AC generator including one embodiment according to the bearing cooling mechanism of the present invention. The arrangement illustrated comprises a rotor 10 including a rotary shaft 12 centrally extending therethrough and rotatably supported at both ends to a frame 14 through a pair bearings 16 and 18 centrally disposed on the inside of the respective opposite end surfaces of the frame 14. A plurality of suction holes 20 for sucking cooling air are disposed on one end surface, in this case, the left-hand end surface as viewed in FIG. 1 of the frame 14 to be located at predetermined equal intervals about the center thereof and communicate with the interior of the frame 14 adjacent to the bearing 18. Also, a plurality of holes are similarly disposed on the other or right-hand end surface of the frame 14. That portion of the rotary shaft 12 rotatably protruding from the right-hand end surface of the frame 14 and therefore the bearing 16 has a pulley 22 and a cooling fan 24 mounted to the extremity thereof by a nut and a spring washer.

According to the present invention, a plurality of ventilating holes 26, in this case, the four holes (see FIG. 2 wherein there are only illustrated the pulley 22, the cooling fan 24, the ventilating holes 26 and the associated components) extend through those portions of the pulley 22 and the cooling fan 24 overlapped on each other and adjacent to the protruding portion of the rotary shaft 12 and therefore to the bearing 16.

Figure 2:
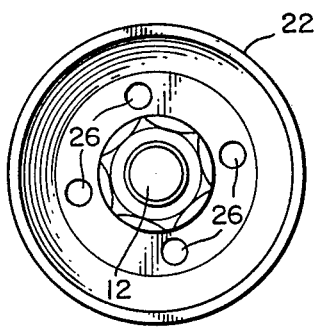
FIG. 2 is a plan end view of the essential part of the arrangement shown in FIG. 1 as viewed from that end thereof provided with the pulley and cooling fan also shown in FIG. 1.

The operation of the arrangement shown in FIGS. 1 and 2 will now be described. The pulley 22 is externally driven to be rotated to rotate the cooling fan 24. This rotation of the cooling fan 24 permits air warmed within the frame 14 to be delivered to the exterior of the latter which is attended with the suction of cooling air into the frame 14 through suction holes 20. The sucked cooling air cools the bearing 18, the rotor 10 etc. disposed within the frame 14 to be warmed after which the warmed air is delivered to the exterior of the frame 14 as shown by the arrow 26.

According to the present invention, the four ventilating holes 26 extend through the overlapped portions of the pulley 22 and the cooling fan 24 and adjacent to the bearing 16 as described above. Thus, cold cooling air is also sucked into a space disposed on the inside of the cooling fan 24 to directly contact the bearing 16 to cool it.

Figure 3:
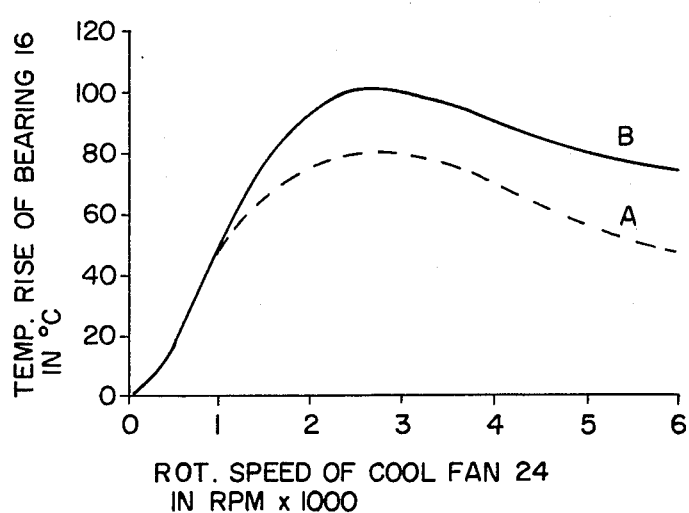
FIG. 3 is a graph illustrated the cooling effect exhibited by the arrangement shown in FIGS. 1 and 2 as compared with the prior art practice.

FIG. 3 shows a temperature rise in degrees C. of the bearing 16 plotted in ordinate against a rotational speed in rpm×1,000 of the cooling fan 24 in abscissa. A dotted curve A depicts the arrangement shown in FIGS. 1 and 2 while a solid curve B depicts the prior art arrangement without the ventilating holes 26.

From FIG. 3 it is seen that the presence of the ventilating holes 26 ensures that the bearing 16 has a temperature rise smaller by at least 20 degrees C. than that developed in the absence of the ventilating holes 26 at rotational speeds of the cooling fan 24 in excess of 2,000 revolutions per minute.

In summary, the present invention provides a bearing cooling mechanism for a vehicular AC generator including a plurality of ventilating holes extending through those portions the overlapped pulley and cooling fan located adjacent to an adjacent one of the bearings and therefore a common rotary shaft thereof also serving as a rotary shaft of the rotor. This measure permits cooling air to directly contact that bearing since that air remains cold without being warmed on its way to the bearing. Thus, the bearing can be sufficiently cooled and is therefore attended with an increase in durability.

While the present invention has been illustrated and described in conjunction with a single preferred embodiment thereof it is to be understood that numerous changes and modifications may be resorted to without departing from the spirit and scope of the present invention.

What is claimed is:

1. A bearing cooling mechanism for a vehicular AC generator comprising a frame, a rotary shaft of a rotor rotatably mounted to said frame through a pair of opposite bearings, a pulley and a cooling fan fixedly secured in overlapped relationship on said rotary shaft at one end thereof protruding from an adjacent one of said bearings, and a plurality of ventilating holes extending through portions of said pulley and cooling fan adjacent to said rotary shaft to be located at predetermined equal angular intervals about the longitudinal axis of said rotary shaft.

* * * * *